United States Patent
Rhe et al.

(10) Patent No.: US 10,976,848 B2
(45) Date of Patent: Apr. 13, 2021

(54) DISPLAY APPARATUS WITH TOUCH SENSOR

(71) Applicant: LG Display Co., Ltd., Seoul (KR)

(72) Inventors: Ruda Rhe, Seoul (KR); JiHyun Jung, Gyeonggi-do (KR); Hyangmyoung Gwon, Gyeonggi-do (KR); JaeGyun Lee, Gyeonggi-do (KR); Jungho Jo, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 23 days.

(21) Appl. No.: 16/510,276

(22) Filed: Jul. 12, 2019

(65) Prior Publication Data
US 2020/0026384 A1 Jan. 23, 2020

(30) Foreign Application Priority Data
Jul. 19, 2018 (KR) .................. 10-2018-0084258

(51) Int. Cl.
*G06F 3/044* (2006.01)
*G06F 3/041* (2006.01)
*G09G 3/20* (2006.01)

(52) U.S. Cl.
CPC .......... *G06F 3/0412* (2013.01); *G06F 3/0445* (2019.05); *G09G 3/2092* (2013.01); *G09G 2300/0408* (2013.01); *G09G 2300/0426* (2013.01); *G09G 2300/0814* (2013.01); *G09G 2310/0278* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0291009 | A1* | 12/2007 | Wright | G06F 3/0446 345/173 |
| 2012/0268402 | A1* | 10/2012 | Wang | G06F 3/0446 345/173 |
| 2013/0194204 | A1* | 8/2013 | Kang | G06F 3/041 345/173 |
| 2014/0062907 | A1 | 3/2014 | Kim | |

(Continued)

FOREIGN PATENT DOCUMENTS

KR 20180054385 * 11/2016
KR 20170079666 A 7/2017

OTHER PUBLICATIONS

Combined Search and Examination Report issued in United Kingdom Patent Application No. 1910387.8 dated Dec. 27, 2019 (10 pages).

*Primary Examiner* — Parul H Gupta
(74) *Attorney, Agent, or Firm* — Polsinelli PC

(57) ABSTRACT

A display apparatus includes a substrate; a display area defined on the substrate and on which a plurality of pixels are disposed; a pad area defined on the substrate and on which a plurality of pads are disposed; a circuit area including a plurality of multiplexer circuits disposed between the display area and the pad area; a touch sensor part including a plurality of touch electrodes disposed at the display area; a plurality of touch electrode lines connecting the plurality of touch electrodes and the plurality of multiplexer circuits; and a touch wiring connecting the plurality of multiplexer circuits and the plurality of pads, wherein the plurality of multiplexer circuits selectively connects a touch electrode line among the plurality of touch electrode lines with the touch wiring.

21 Claims, 9 Drawing Sheets

(56) References Cited

U.S. PATENT DOCUMENTS

| | | |
|---|---|---|
| 2017/0045968 A1 | 2/2017 | Liu et al. |
| 2018/0138450 A1* | 5/2018 | Park .................... H01L 51/5256 |
| 2018/0150178 A1 | 5/2018 | Kim et al. |
| 2019/0171317 A1 | 6/2019 | Baek |
| 2019/0196643 A1 | 6/2019 | Chung et al. |

* cited by examiner

DISPLAY APPARATUS WITH TOUCH SENSOR

CROSS-REFERENCE TO RELATED APPLICATION

This application claims priority from Korean Patent Application No. 10-2018-0084258, filed on Jul. 19, 2018, which is hereby incorporated by reference in its entirety.

BACKGROUND

Field of the Disclosure

The present disclosure relates to a display apparatus having a touch sensor.

Description of the Background

As the information society develops, the demand for display devices for displaying images is increasing in various forms. Various types of display devices such as a liquid crystal display device (LCD), a plasma display device, and an organic light emitting display device (OLED) have been used for this purpose.

The organic light emitting display device among these display devices has self-emission characteristics and has excellent response speed, viewing angle and color reproducibility, and can be manufactured to be thin.

The display device may operate in response to an input signal received through various input devices such as a keyboard and a mouse. The display device can input a user's command intuitively and conveniently by touching the screen using the touch panel. The touch panel may be disposed on the screen of the display device and allows the user to input a command of the user by touching a specific point on the screen of the display device. Such a touch panel may be embedded in the display device and integrated with the display device. The touch panel integrated in the display device may be referred to as a touch sensor.

The touch sensor includes a plurality of touch electrodes, and the touch electrodes can receive the touch driving signal through the touch lines and output the touch sensing signal. In recent years, due to the increase tendency in the size of the display device, the number of touch electrodes disposed on the display device may increase, so that the number of touch hones for transmitting the touch driving signals to the touch electrodes should be increased. As a result, the number of touch driving signals outputted from the touch IC also increases. In addition, a plurality of touch driving signals may be simultaneously output to sense touches occurring at various points on the display device. As a result, since the touch drive circuit should output a large number of touch driving signals, the size of the touch drive circuit inevitably increases.

SUMMARY

The present disclosure is to provide a display device including a touch sensor with a thin thickness.

The present disclosure is to provide a display device including a touch sensor capable of reducing the size of the touch drive circuit.

In accordance with an aspect of the present disclosure, there may be provided with a display apparatus including a substrate; a display area defined on the substrate and on which a plurality of pixels are disposed; a pad area defined on the substrate and on which a plurality of pads are disposed; a circuit area including a plurality of multiplexer circuits disposed between the display area and the pad area; a touch sensor part including a plurality of touch electrodes disposed at the display area; a plurality of touch electrode lines connecting the plurality of touch electrodes and the plurality of multiplexer circuits; and a touch wiring connecting the plurality of multiplexer circuits and the plurality of pads, wherein the plurality of multiplexer circuits selectively connects a touch electrode line among the plurality of touch electrode lines with the touch wiring.

In accordance with another aspect of the present disclosure, there may be provided with a display apparatus including a substrate; a display area defined on the substrate, on which a plurality of pixels are arranged; a pad area defined on the substrate and on which a plurality of pads are disposed; a bending area defined on the substrate and disposed between the display area and the pad area; a touch sensor part including a plurality of touch electrodes disposed at the display area, a first organic film disposed at the bending area; a first wiring disposed on the first organic film; a second organic film disposed on the first wiring; and a second wiring disposed on the second organic film where a contact hole is formed corresponding to at least two points, wherein the second wiring is connected to the first wiring through the contact hole.

According to the aspects, it is possible to provide the display device including a thin touch sensor.

According to the aspects, it is possible to provide the display device having the touch sensor capable of reducing the size of the touch drive circuit, thereby reducing manufacturing cost.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
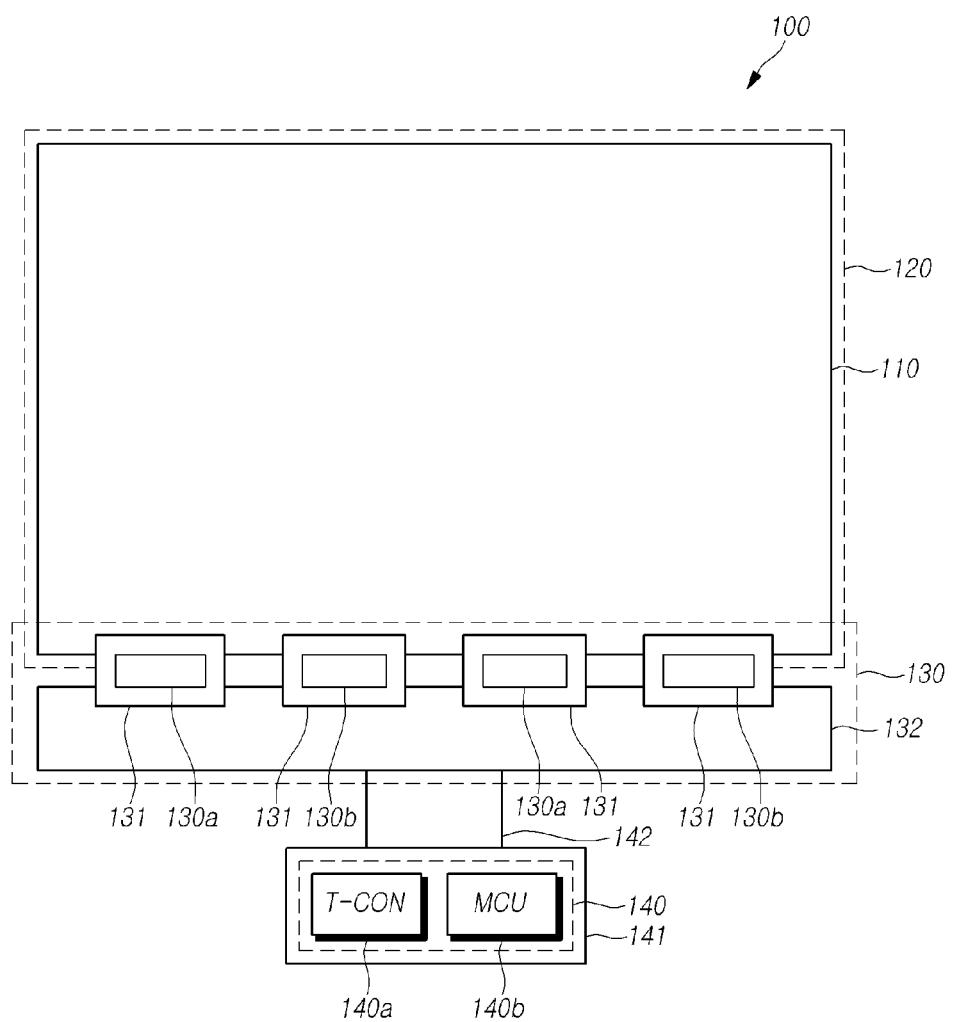
FIG. 1 is a structural diagram illustrating an aspect of the display apparatus having the touch sensor part according to the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a structural diagram illustrating a display apparatus having a touch sensor part according to the present disclosure.

Referring to FIG. 1, the display device 100 may include the display panel 110, the touch sensor part 120, the circuit part 130 and the control unit 140. The display device 100 may be a liquid crystal display device or an organic light emitting display device, but is not limited thereto.

Figure 2:
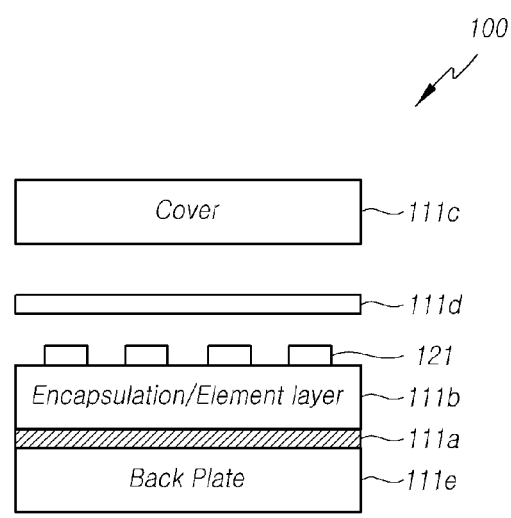
FIG. 2 is a conceptual diagram illustrating an aspect of the display device according to the present disclosure.

In the display panel 110, a plurality of gate lines (not shown) and a plurality of data lines (not shown) are arranged so as to intersect with each other, and a plurality of subpixels (not shown) may be arranged in a region where the plurality of gate lines intersect with the plurality of data lines in the substrate 111a shown in FIG. 2. In the case that the display device 100 is an organic light emitting display device, each subpixel of the display panel 110 may include a light emitting element and a pixel circuit (not shown) for supplying a driving current to the light emitting element. The light emitting element may be an organic light emitting diode (OLED), but is not limited thereto. The organic light emitting diode may include the organic layer, and an anode electrode and a cathode electrode through which current flows in the organic layer. The pixel circuit may be connected to a power source or lines for transmitting a signal.

The pixel circuit may be connected to the gate line for transferring the gate signal and the data line for transferring the data signal. Furthermore, the pixel circuit may receive the data signal in response to the gate signal, and may generate the driving current and supply the driving current to the light emitting element. In addition, the pixel circuit may be connected to a separate power line (not shown) to receive the driving current. However, the line connected to the pixel circuit is not limited thereto. The gate signal and the data signal may be referred to as a display driving signal. However, the display driving signal is not limited thereto.

The touch sensor part 120 may sense a touch point of the display panel 110. The touch sensor part 120 may include a plurality of touch electrodes disposed on the display panel 110. Also, the plurality of touch electrodes may be connected to the touch lines, and the touch lines may transmit and receive touch signals. The touch signal may be a touch driving signal and a touch sensing signal. Here, the touch sensor part 120 is shown as one component on the display panel 110, but it is only conceptual and not limited thereto.

The circuit part 130 may transfer the display driving signal and the touch signal to the display panel 110 and the touch sensor part 120, respectively. The circuit part 130 may include the display drive circuit 130a for supplying the display driving signal and the touch drive circuit 130b for transmitting and receiving the touch signal. The display drive circuit 130a and the touch drive circuit 130b may be an integrated circuit.

The display drive circuit 130a may include the gate driver for outputting the gate signal and the data driver for outputting the data. The display drive circuit 130a may receive the gate control signal and the data control signal and may operate the gate driver and the data driver. In the case that the gate-in-panel (GIP) is disposed on the display panel 110, the gate driver controls the gate-in-panel (GIP), the gate-in-panel (GIP) receives the control signal from the gate driver, and generates and transmits the gate signal to the gate line. The gate control signal may be a clock, a start pulse, or a synchronization signal, however, is not limited thereto.

In addition, the touch drive circuit 130b may receive the touch control signal and transmit/receive the touch signal to/from the touch sensor part 120. The touch signal may include the touch driving signal and the touch sensing signal.

Here, although an aspect in which the number of the display drive circuit 130a and the number of the touch drive circuits 130b are two is shown as an example, the present disclosure is not limited thereto. In addition, the display drive circuit 130a and the touch drive circuit 130b may be disposed on a flexible printed circuit board (FPCB) 131, respectively. Although the display drive circuit 130a and the touch drive circuit 130b are shown as alternately arranged, the present disclosure is not limited thereto. The number of the display drive circuit 130a and the number of the touch drive circuits 130b are shown to be the same, but the present disclosure is not limited thereto. The FPCB 131 may be connected to the substrate 111a and the source printed circuit board (SPCB) 132 and may transmit the driving control signal and the touch control signal received through the SPCB 132 to the display drive circuit 130a and the touch drive circuit 130b respectively. However, the arrangement of the circuit part 130 is not limited thereto, and the circuit part 130 may be disposed in a part of the area on the substrate 111a.

The control unit 140 may control the display drive circuit 130a and the touch drive circuit 130b. The control unit 140 may output the driving control signal and the touch control signal. The control unit 140 may include the driving control unit 140a and the touch control unit 140b. The driving control unit 140a may be a timing controller (T-CON) and the touch control unit 140b may be a micro-control unit (MCU).

The driving control unit 140a and the touch control unit 140b may be disposed on a control printed circuit board (CPCB) 141 and the CPCB 141 may be connected to the circuit part 130 through the flexible flat circuit (FFC) 142.

FIG. 2 is a conceptual diagram illustrating the display device according to the present disclosure.

Referring to FIG. 2, the display device 100 may include an encapsulation/element layer 111b including an element layer disposed on the substrate 111a and an encapsulation protecting the element layer. The element layer may include a thin film transistor (TFT), a capacitor, and a light emitting element included in the pixels. The encapsulation may include an organic film and/or an inorganic film, and may be an encapsulation layer that protects the light emitting element above the element layer. The touch electrode/touch electrode line 121 may be disposed above the encapsulation/ element layer 111b. The touch electrode/touch electrode line 121 may correspond to the touch sensor part 120 shown in FIG. 1. Here, the touch electrode/touch electrode line 121 is illustrated to be formed on the same layer on the encapsulation/element layer 111b, but is not limited thereto.

The touch electrode may include a touch driving electrode and a touch sensing electrode. In the case that the touch electrode/touch electrode line 121 includes the touch driving electrode and the touch sensing electrode, the touch driving electrode and the touch sensing electrode may be disposed on different layers with an insulation film interposed therebetween. In addition, the touch driving electrode and the touch sensing electrode may be disposed on the same layer and may be connected to each other through a bridge. Furthermore, the bridge may be disposed on different layers with the touch driving electrode and the touch sensing electrode disposed on the same layer with the insulation film interposed therebetween. Since the touch driving electrode and the touch sensing electrode are connected through the bridge, the touch driving electrode and the touch sensing electrode may not be directly connected to each other at the same layer.

The touch electrode line may be a wiring for transmitting a signal to the touch electrode or a wiring for receiving a signal generated from the touch electrode. However, the present disclosure is not limited thereto.

Although the touch electrode/touch electrode line 121 is illustrated to be directly attached to the upper portion of the encapsulation/element layer 111b, the present disclosure is not limited thereto, and the buffer layer is disposed the encapsulation/element layer 111b and the touch electrode/touch electrode line 121 is disposed on the buffer layer so that the encapsulation/element layer 111b is prevented from being damaged in the process of forming the touch electrode/touch electrode line 121.

The cover glass 111c may be disposed on the encapsulation/element layer 111b on which the touch electrode/touch electrode line 121 is disposed. The cover glass 111c may be fixed on the touch electrode/touch electrode line 121 by an adhesive 111d. The back plate 1110e may be disposed under the substrate 111a. Furthermore, in the case that a thin film transistor (TFT) is arranged on the substrate 111a, wirings or lines for transmitting signals may also be formed.

Since the touch electrode/touch electrode line 121 is disposed on the encapsulation/element layer 111b, the thickness of the display device 100 can be reduced.

Figure 3:
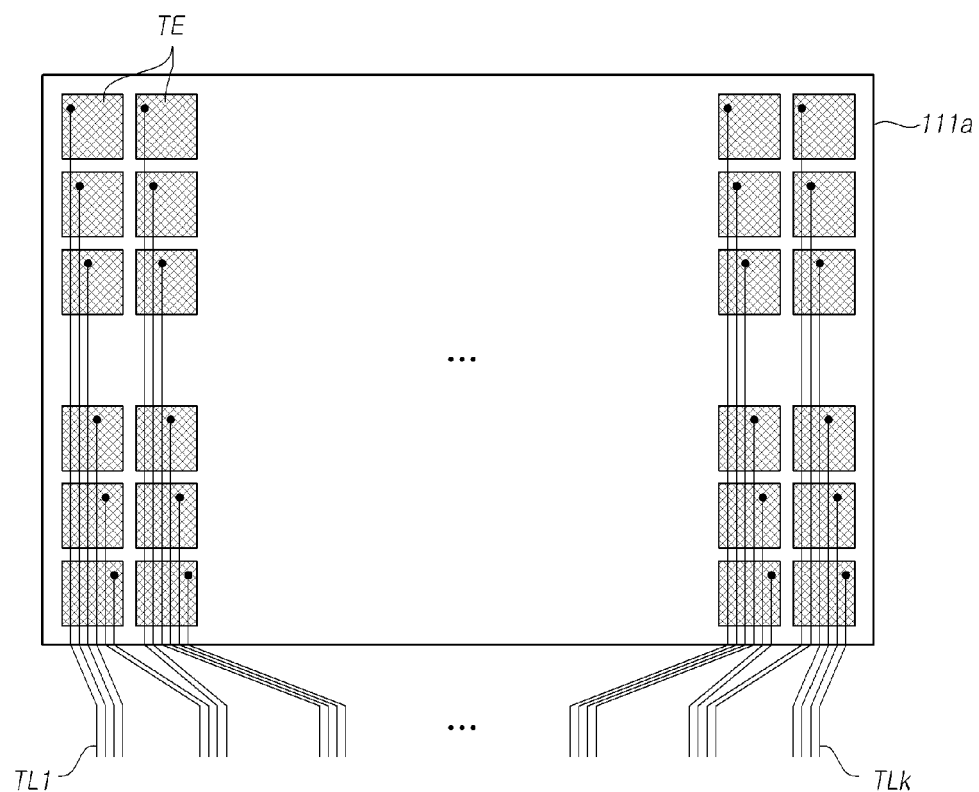
FIG. 3 is a plan view illustrating the touch sensor part shown in FIG. 1.

FIG. 3 is a plan view illustrating the touch sensor part shown in FIG. 1.

Referring to FIG. 3, the touch sensor part 120 may include a plurality of touch electrodes TE arranged in a matrix shape and the touch electrode lines TL1, . . . , and TLk may be disposed on each touch electrodes TE. One touch electrode line may be connected to one touch electrode and the touch electrode line may overlap with the touch electrode TE disposed thereon. The touch electrode TE may be a transparent electrode. The transparent electrode may be formed of indium tin oxide (ITO) or indium zinc oxide (IZO), but is not limited thereto.

Alternatively, the touch electrode TE may be formed of an opaque metallic material. In the case that the touch electrode TE is formed of an opaque metallic material, the touch electrode TE may be formed in a mesh shape in which one opening or two or more openings are formed. Each of one opening or two or more openings of the touch electrode TE may be disposed at a position corresponding to the light emitting layer or the light emitting region of the display panel 110 so that it is possible to prevent the aperture ratio of the display panel 110 from being lowered by the touch electrode TE. Here, although the shape of the touch electrode TE is illustrated as a square, but is not limited thereto, may be various types such as a rhombus shape.

The touch electrode lines TL1~TLk may transfer the touch driving signal generated in an external device (not shown) to the touch electrode TE and may receive the touch sensing signal from the touch electrode TE and transmit to the external device. The external device may be, but is not limited to, the touch drive circuit 130b shown in FIG. 1.

The number of the touch electrodes TE formed as described above may be determined corresponding to the size of the display panel 110. If the number of the touch electrodes TE is large, the number of the touch electrode lines TL1, . . . , TLk connected to the touch electrode TE also increases. Here, the touch sensor part 120 is illustrated as being a self-capacitance type, but the present disclosure is not limited thereto, and the touch sensor part 120 disposed on the display panel 110 may be implemented by a mutual capacitance method.

Figure 4:
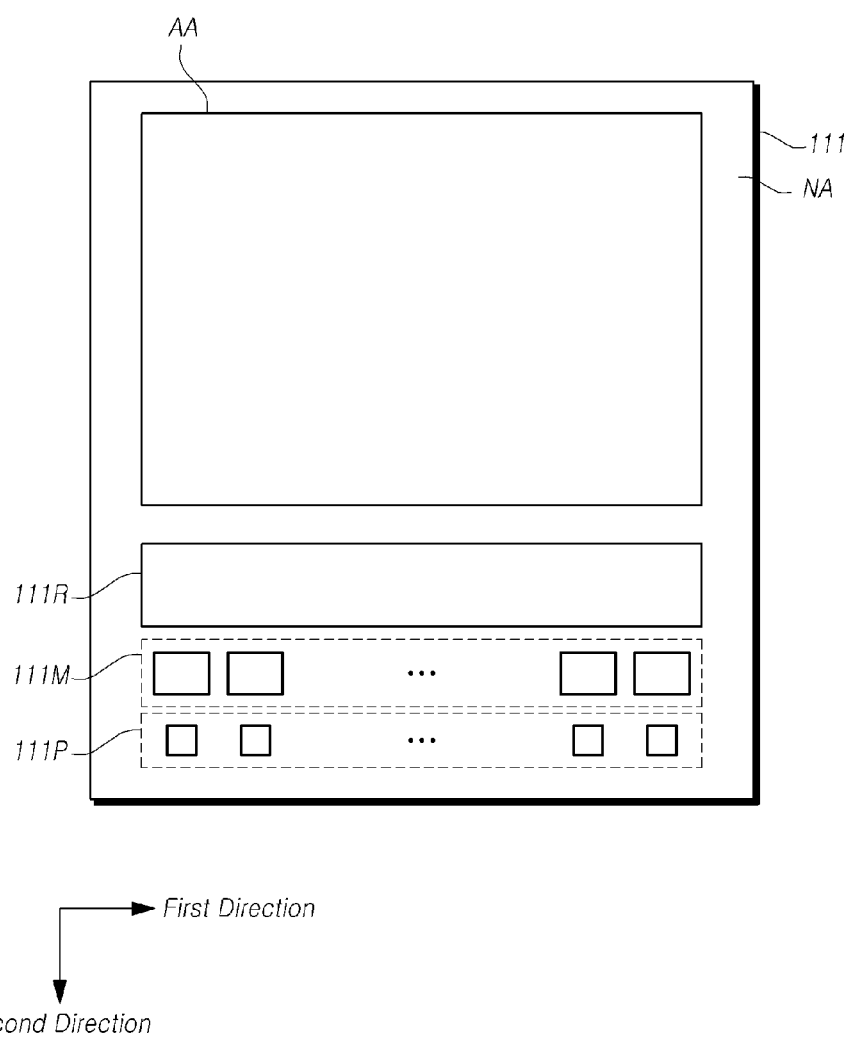
FIG. 4 is a plan view illustrating an aspect of the substrate included in the display panel shown in FIG. 1.

FIG. 4 is a plan view illustrating the substrate included in the display panel shown in FIG. 1.

Referring to FIG. 4, the substrate 111a may be divided into a display area (AA) and a non-display area (NAA). The substrate 111a may be formed of plastic or glass material. In the display area (AA), the plurality of gate lines and the plurality of data lines may be arranged, and sub pixels may be disposed in an area defined by intersecting gate lines and data lines.

The non-display area (NAA) may be disposed in the periphery of the display area (AA), and wirings for transmitting signals and/or voltages applied to the subpixels may be disposed in the non-display area (NAA). In the non-display area (NAA) arranged in the second direction of the display area (AA), the bending area 111R which is a region where the substrate 111a is bent, and the circuit area 111M in which a plurality of multiplexer circuits 410 are arranged, and the pad area 111P in which a plurality of pads are disposed. The display area and the non-display area may also be referred to an active area and a non-active area, respectively.

The bending area 111R may be formed on the substrate 111a and may be a region where a structure for allowing the substrate for being bent or for preventing the substrate 111a from being damaged when the substrate is bent. The circuit area 111M is an area where a plurality of circuit elements are arranged. The circuit elements may be arranged in a first direction. In the circuit area 111M, a plurality of multiplexer circuits may be arranged in the first direction. Each of the plurality of multiplexer circuits disposed in the circuit area 111M may include one or more input terminals and a plurality of output terminals, and may selectively connect one input terminal to at least one output terminal.

The pad area 111P is an area where a plurality of pads are arranged. The plurality of pads disposed in the pad area 111P may include the pad for supplying the touch signal and the pad for supplying the display signal. In the pad area 111P, a plurality of pads may be arranged in the first direction. The bending area 111R, the circuit area 111M and the pad area 111P may be arranged in the second direction in the non-display area (NAA), however, is not limited thereto. If the multiplexer circuit is formed in the circuit area 111M, the number of pads for supplying the touch signal may be reduced. Therefore, it is possible to increase the number of pads for supplying display signals disposed on the substrate, which is advantageous in designing a high-resolution and large-area display device. The pad for supplying the display signal may be disposed in the pad area 111P.

Figure 5:
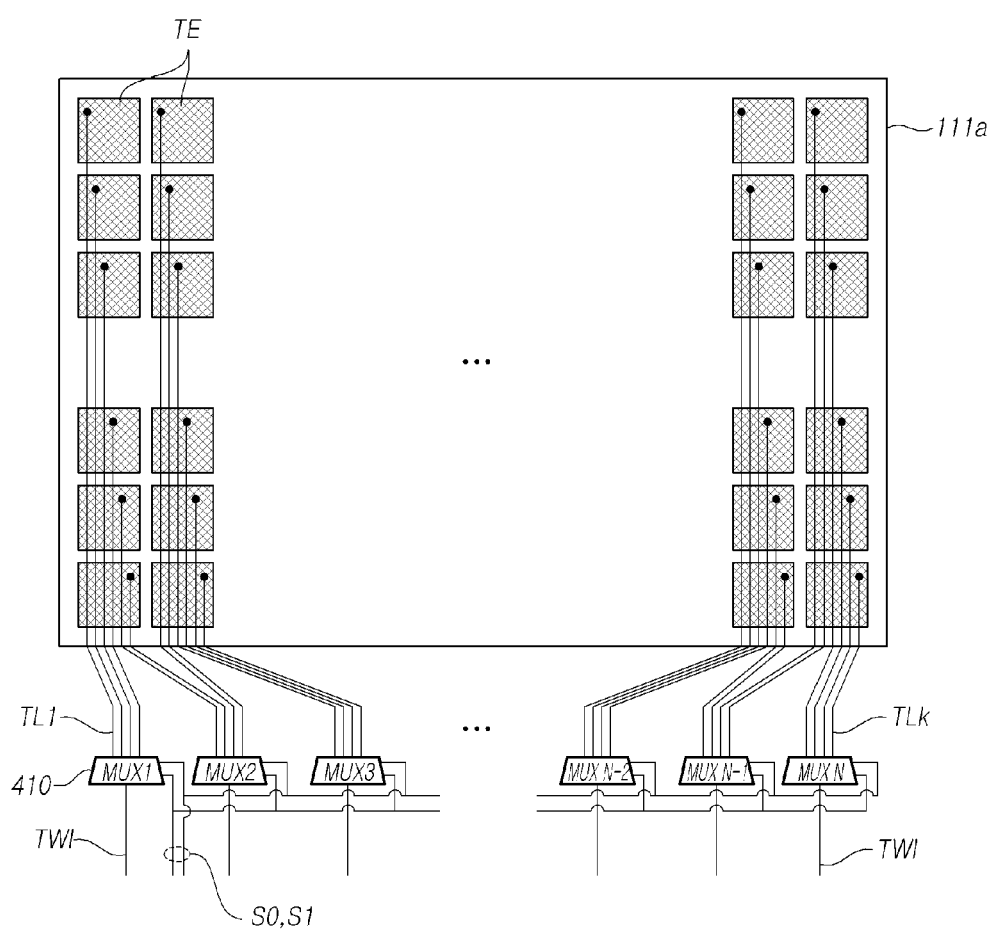
FIG. 5 is a plan view illustrating an aspect of a connection relationship between the multiplexer circuit formed on the substrate and the touch electrode.

FIG. 5 is a plan view illustrating a connection relationship between the multiplexer circuit formed on the substrate and the touch electrode.

Referring to FIG. 5, the touch electrode lines TL1, . . . , TLk may be connected to the plurality of touch electrodes TE arranged on the substrate 111a. In addition, a plurality of multiplexer circuits 410 may be connected to the touch electrode lines TL1, . . . , TLk, and in particular, each of the multiplexer circuits 410 may be connected to two or more touch electrode lines. Furthermore, each of the multiplexer circuits 410 may be connected to one of the plurality of touch wirings TW1, . . . , TWl. Although one multiplexer circuit is illustrated as being connected to four touch electrode lines, it is not limited thereto.

Each of the plurality of multiplexer circuits 410 may be connected to the first selection signal line S0 and the second selection signal line S1. The multiplexer circuit 410 may be connected to the first selection signal line S0 and the second selection signal line S1 in parallel. Accordingly, each of the plurality of multiplexer circuits 410 may receive the first selection signal and the second selection signal which are transmitted to the first selection signal line S0 and the second selection signal line S1. The multiplexer circuit 410 may select one or more of the touch electrode lines TL1, . . . , TLk and supply the touch signal input from the touch wiring TW1 to the selected touch electrode line. Here, the plurality of multiplexer circuits 410 are arranged in the circuit area 111M of FIG. 4, but it is not limited to the multiplexer circuit 410 which is arranged in the circuit area 111M.

Each of the plurality of touch electrode lines TL1~TLk, the first selection signal line S0 and the second selection signal line S1 may be connected to the multiplexer circuit 410 at one end and connected to the touch electrode TE at the other end. The plurality of touch electrode lines TL1~TLk arranged between the substrate 111a and the multiplexer circuit 410 may be arranged at positions corresponding to the bending area 111R in FIG. 4 and the multiplexer circuit 410 may be disposed in the circuit area 111M of FIG. 4. The plurality of touch wirings TW1, . . . , TWl, the first selection signal line S0 and the second selection signal line S1 may be connected to the pad, respectively. The plurality of touch wirings TW1~TWl, the first selection signal line S0, the second selection signal line S1 and the pads may be disposed in the pad area 111P.

Figure 6:
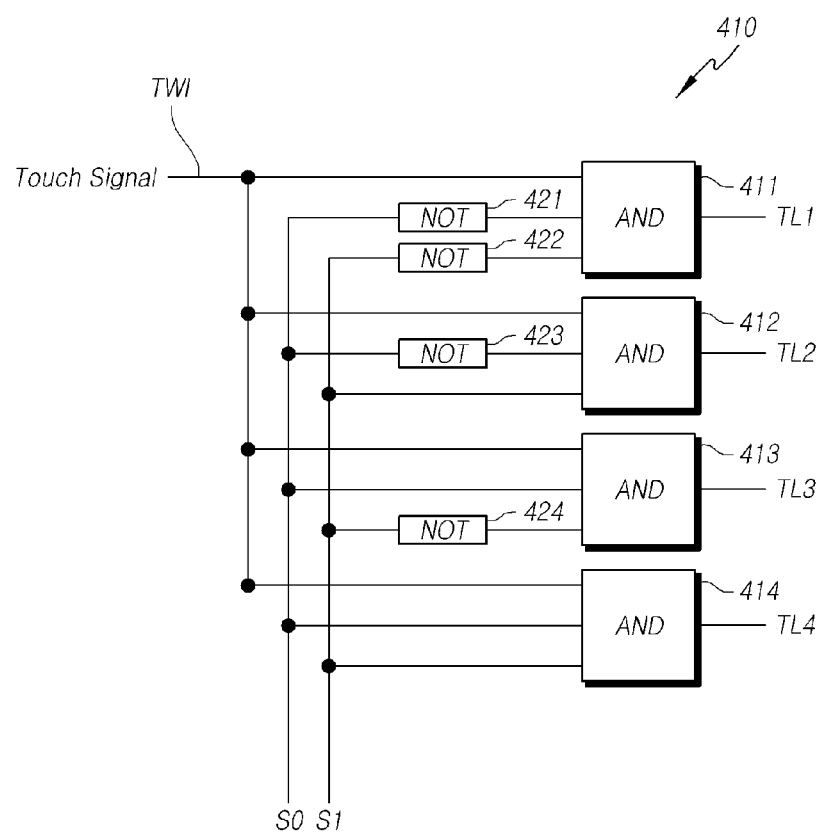
FIG. 6 is a logic circuit diagram illustrating an aspect of the multiplexer circuit shown in FIG. 5.

FIG. 6 is a logic circuit diagram illustrating the multiplexer circuit shown in FIG. 5.

Referring to FIG. 6, the multiplexer circuit 410 may include four AND operators 411, 412, 413, and 414, and four NOT operators 421, 422, 423, and 424. In addition, the multiplexer circuit 410 may be connected to the first selection signal line S0 and the second selection signal line S1 to receive the first selection signal and the second selection signal.

The first AND operator 411 may include three input terminals. The first input terminal is connected to the touch wiring TW1, and the second input terminal and third input terminal are connected to the first selection signal line S0 and the second selection signal line S1 through the first NOT operator 421 and the second NOT operator 422. The output terminal of the first AND operator 411 may be connected to the first touch electrode line TL1.

The second AND operator 412 may include three input terminals. The first input terminal is connected to the touch wiring TW1, and the second input terminal is connected to the first selection signal line S0 through the third NOT operator 423. The output terminal of the second AND operator 412 may be connected to the second touch electrode line TL2.

The third AND operator 413 may include three input terminals. The first input terminal is connected to the touch wiring TW1, and the third input terminal is connected to the second selection signal line S1 through the fourth NOT operator 424. The output terminal of the third AND operator 413 may be connected to the third touch electrode line TL3.

The fourth AND operator 414 may include three input terminals. The first input terminal is connected to the touch wiring TW1, and the second input terminal is connected to the first selection signal line S0, and the third input terminal is connected to the second selection signal line S1. The output terminal of the fourth AND operator 414 may be connected to the fourth touch electrode line TL4.

The multiplexer circuit 410 connected as described above may receive the first selection signal transmitted through the first selection signal line S0 and the second selection signal transmitted through the second selection signal line S1, and may supply the touch signal transferred through the touch wiring to one of the first to fourth touch electrode lines TL1 to TL4 in response to the first selection signal and the second selection signal. The touch signal is described as being a high level signal, but is not limited thereto, and the touch signal may be a signal having a predetermined frequency. The first selection signal and the second selection signal may be signals having the same frequency and phase, but are not limited thereto.

Since the first to fourth AND operators 411 to 414 perform an AND operation, they can output a high level signal only in the case that all of the input signals are high level signals. Accordingly, when the touch signal is transmitted through the touch line TW1, if the first selection signal and the second selection signal are both transmitted as a low level signal, the first AND operator 411 may receive high level signals corresponding to the first selection signal and the second selection signal through the first and second NOT operators 421 and 422, thus, the first AND operator 411 outputs the high level touch signal as the AND operation result. On the other hand, since the second to fourth AND operators 412, 413, 414 receive the low level signal corresponding to the first selection signal and/or the second selection signal, the second to fourth AND operators 412~414 may output a low level signal as the AND operation result. Accordingly, the touch signal can be output to the first touch electrode line TL1 connected to the output terminal of the first AND operator 411. However, the touch signals are not output to the second to fourth touch electrode lines TL2~TL4 connected to the output terminals of the second to fourth AND operators 412~414.

In the case that the first selection signal is the low level signal and the second selection signal is the high level signal, the second AND operator 412 may receive the first selection signal of high level by the third NOT operator 423, and can output the high level touch signal to the second touch electrode line TL2. However, since the first AND operator 411, the third AND operator 413 and the fourth AND operator 414 output the low level signal as the AND operation result, the touch signal is not output to the first touch electrode line TL1, the third electrode line TL3 and the fourth touch electrode line TL4.

In the case that the first selection signal is the high level signal and the second selection signal is the low level signal, the third AND operator 413 may receive the high level signal corresponding to the second selection signal inverted by the fourth NOT operator 424, and the high level touch signal can be output to the third touch electrode line TL3. However, since the first AND operator 411, the second AND operator 412 and the fourth AND operator 414 output the low level signal as the AND operation result, the touch signal is not output to the first touch electrode line TL1, the second touch electrode line TL2 and the fourth touch electrode line TL4.

In the case that the first selection signal and the second selection signal are high level signals, only the fourth AND operator 414 can receive the first and second selection signals of high level, and may output the high level touch signal to the fourth touch electrode line TL4 as the AND operation result. However, since the first to third AND operators 411 to 413 output the low level signal as the AND operation result, the touch signal is not output to the first touch electrode line TL1, the second touch electrode line TL2 and the third touch electrode line TL3.

As described above, since the touch signal can be applied to one of the plurality of touch electrode lines by using the first selection signal and the second selection signal, the number of touch wirings for applying the touch signal can be reduced to be smaller than the number of touch electrode lines. Therefore, even if the size of the display panel increases, the number of touch wirings can be prevented from being increased, and the size of the touch drive circuit can be reduced, thereby reducing the manufacturing cost of the display device.

Figure 7:
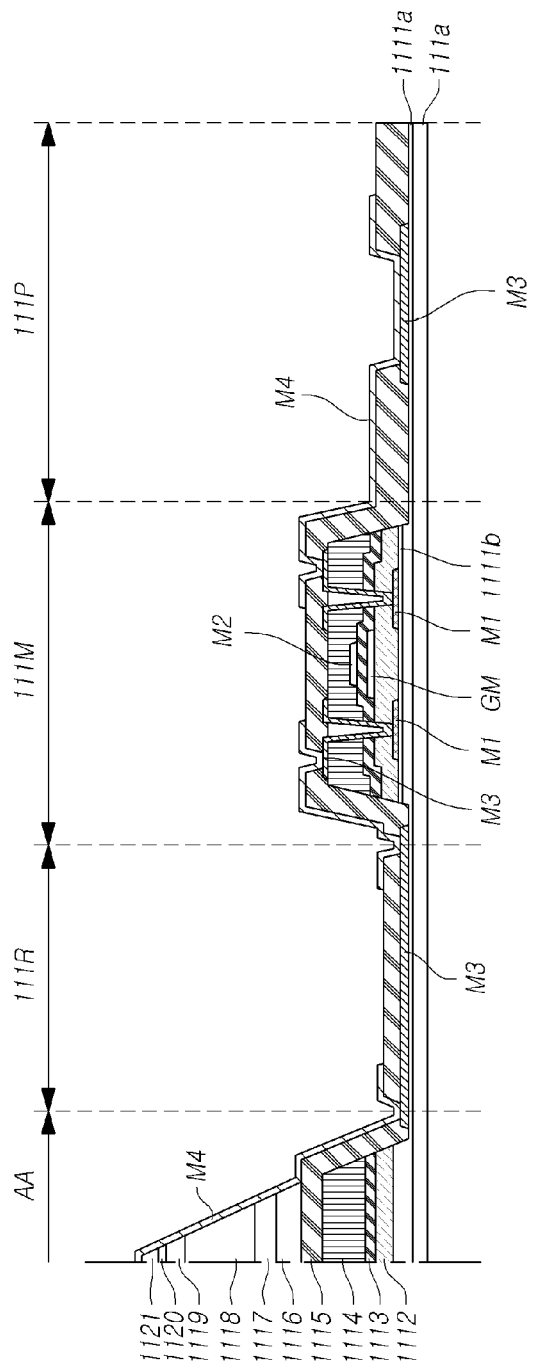
FIG. 7 is a cross-sectional view illustrating the first aspect of the cross section of a non-display area in the state in which the touch sensor part is mounted to the first substrate shown in FIG. 2.
Figure 8:
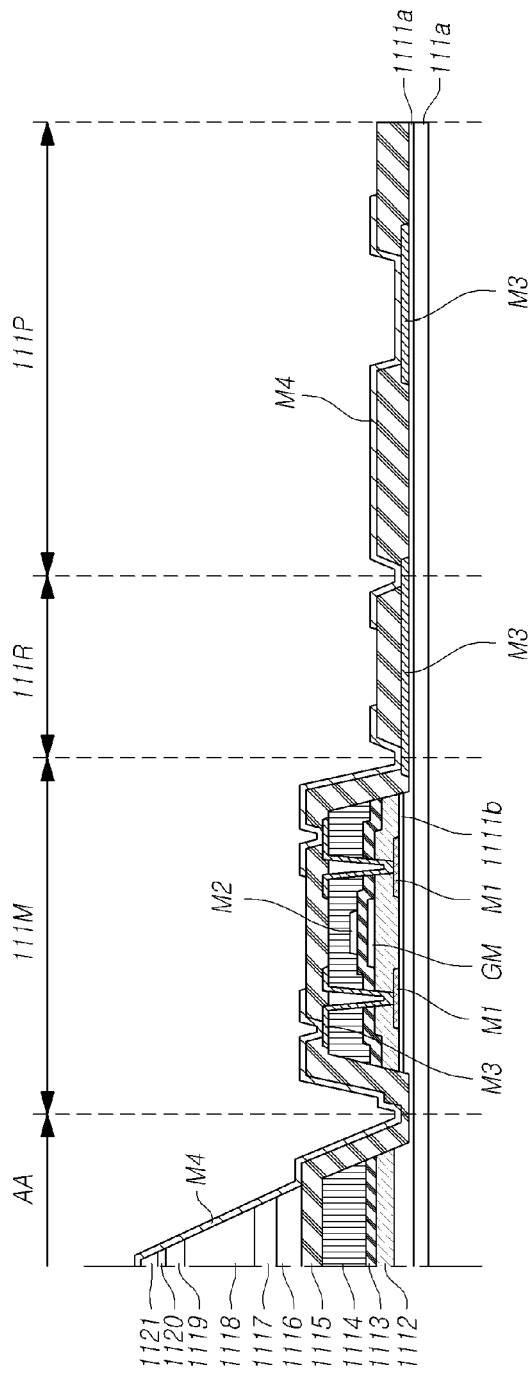
FIG. 8 is a cross-sectional view illustrating the second aspect of the cross section of a non-display area in the state in which the touch sensor part is mounted to the first substrate shown in FIG. 2.

FIG. 7 is a cross-sectional view illustrating the first aspect of the cross section of a non-display area in the state in which the touch sensor part is mounted to the first substrate shown in FIG. 2, and FIG. 8 is a cross-sectional view illustrating the second aspect of the cross section of a non-display area in the state in which the touch sensor part is mounted to the first substrate shown in FIG. 2.

Referring to FIG. 7, the display area AA, the bending area 111R, the circuit area 111M and the pad area 111P may be disposed on the substrate 111a.

The display area AA, the bending area 111R, the circuit area 111M and the pad area 111P may be formed on the substrate 111a using a plurality of metal layers and a plurality of insulation films. The circuit area 111M may be formed when the pixel circuit is formed in the display area AA and then the bending area 111R and the pad area 111P may be disposed according to the deposition process.

When the touch sensor part 120 is formed after forming the display area AA, the touch electrode, the touch electrode line and the touch wiring can be simultaneously formed using the same metal layer. Alternatively, the touch electrode line may be formed in the display area AA, and then an insulation film may be disposed on the touch electrode line, and the contact hole may be formed in the insulation film so that the touch electrode line may be in contact with one point of the touch electrode.

The formation process of the display area AA, the bending area 111R, the circuit area 111M and the pad area 111P arranged on the substrate 111a will be described more specifically. The first buffer layer 1111a and the second buffer layer 1111b may be disposed on the substrate 111a. The first buffer layer 1111a and the second buffer layer 1111b may be organic films. In the bending area 111R, the first buffer layer 1111a may be referred to as a first organic film. Then, the circuit area 111M may be formed by using a mask. The first buffer layer 1111a and the second buffer layer 1111b may be sequentially formed in the circuit area 111M and the first metal layer M1 may be formed on the second buffer layer 1111b. The plurality of AND operators 411~414 and NOT operators 421~424 of the multiplexer circuit 410 shown in FIG. 6 may include a plurality of transistors, and the first metal layer M1 may correspond to the source/drain electrodes of the plurality of transistors included in the transistor. Also, the first metal layer M1 may be also disposed in the display area AA. The first metal layer M1 formed in the display area AA may correspond to the source/drain electrodes of the plurality of transistors of the pixel circuit.

The first insulation film 1112 may be patterned and disposed on the first metal layer M 1. The gate metal layer GM may be disposed on the first insulation film 1112. In addition, the gate metal layer (GM) can be patterned and arranged. The gate metal layer GM can correspond to the gate electrodes of a plurality of transistors. Although not shown here, an active layer made of a semiconductor element may be disposed under the gate metal layer GM, and the active layer and the gate metal layer may be separated from each other by another insulation film. The position of the active layer is not limited thereto. The second insulation film 1113 may be patterned and disposed on the gate metal layer GM and the second metal layer M2 may be disposed on the second insulation film 1113. The third insulation film 1114 may be disposed on the second metal layer M2.

Then, the third metal layer M3 may be formed by using a mask. The third metal layer M3 may be disposed on the third insulation film 1114 in the display area AA and the circuit area 111M. However, the third metal layer M3 may be disposed on the first buffer layer 1111a in the bending area 111R and the pad area 111P. At this time, in the process of disposing the circuit area 111M, the second buffer layer 1111b of the bending area 111R and the pad area 111P may be entirely etched and a part of the first buffer layer 1111a may be etched. The third metal layer M3 may be formed when forming the anode electrode of the organic light emitting diode. The third metal layer M3 may be formed of the same material as the anode electrode. The fourth insulation film 1115 may be formed on the third metal layer M3.

The fourth insulation film 1115 may be disposed in the display area AA, the bending area 111R, the circuit area 111M and the pad area 111P. A part of the fourth insulation film 1115 may be etched in each of the bending area 111R to form a contact hole, the circuit area 111M and the pad area 111P to expose the third metal layer M3 disposed thereunder. At least two contact holes may be disposed in the fourth insulation film 1115 in the bending area 111R.

Then, the light emitting layer 1116, the cathode electrode 1117, the encapsulation layer 1118, the first touch buffer layer 1119 and the second touch buffer layer 1120 may be formed on the display area AA, and the metal touch electrode connection portion (not shown) may be disposed thereon. The fifth insulation film 1121 may be formed on the touch electrode connection portion, and a part of the touch electrode connection portion and a part of the third metal layer M3 may be exposed by etching a part of the fifth insulation film 1121. The encapsulation layer 1118 may be comprised of a single film or may include one or more inorganic films and one or more organic films. For example, the encapsulation layer 1118 may comprise an inorganic film/organic film/inorganic film.

The fourth metal layer M4 may be formed in the display area AA, the bending area 111R, the circuit area 111M and the pad area 111P. The fourth metal layer M4 may have a disconnected structure on the bending area 111R and the circuit area 111M, but the present disclosure is not limited thereto. The fourth metal layer M4 may be the touch electrode line on the bending area 111R and the circuit area 111M, and the fourth metal layer M4 may be the touch wiring on the pad area 111P. The fourth metal layer M4 may be disposed along the side surface of the encapsulation layer 1118 in the outer area of the display area AA.

The fourth metal layer M4 may be connected without being broken at the bending area 111R. In addition, the fourth metal layer M4 may be in electrical contact with the second metal layer M2 disposed at the lower portion at two or more points. Accordingly, in the case that the bending area 111R is bent, the touch signal can be supplied to the touch electrode through the fourth metal layer M4 disposed above the second metal layer M2 ever if the second metal layer M2 is broken due to damage of the bending area 111R. Alternatively, even if the fourth metal layer M4 is disconnected, the touch signal may be supplied to the touch electrode through the second metal layer M2 disposed thereunder. Therefore, the touch signal can be normally supplied even if a damaged by the bending occurs.

Furthermore, the fourth insulation film 1115 may be formed of an organic film. Since the organic film is a soft material, the fourth insulation film 1115 may allow the substrate 111a to bend more smoothly when the substrate 111a is bent so that it is possible to prevent cracks from occurring in the third metal layer M3 and the fourth metal layer M4 when the bending area 111R is bent. The fourth insulation film 1115 in the bending area 111R may be referred to as a second organic film.

In the bending area 111R, the third metal layer M3 and the fourth metal layer M4 may be referred to as a first wiring and a second wiring, respectively.

Although not shown, an insulation film may be disposed on the fourth metal layer M4, and the touch electrode may be disposed on the insulation film. In the display device implemented as above, the touch signal may be transmitted to the touch electrode on the display device by a touch electrode line and the multiplexer circuit formed by the third metal layer M3 and the fourth metal layer M4.

The bending area 111R may be disposed between the display area AA and the circuit area 111M, but the circuit area 111M may be disposed between the bending area 111R and the display area AA as shown in FIG. 6.

In the process of forming the display area AA on the substrate 111a, the bending area 111R, the circuit area 111M and the pad area 111P may be formed, which can simplify the process.

Although the touch sensor part 120 is illustrated as an example in which the touch electrode is formed by the self-capacitance method, the touch electrode unit 120 is not limited thereto, and the touch electrode unit 120 may be disposed according to the mutual capacitance method. In the case that the touch electrode is arranged in the mutual capacitance method, a bridge connecting the touch sensing electrode or the touch driving electrode may be formed at a position where the touch electrode connection portion is disposed shown in FIG. 7, and the touch sensing electrode and the touch driving electrode may be arranged together with the touch electrode line.

Figure 9:
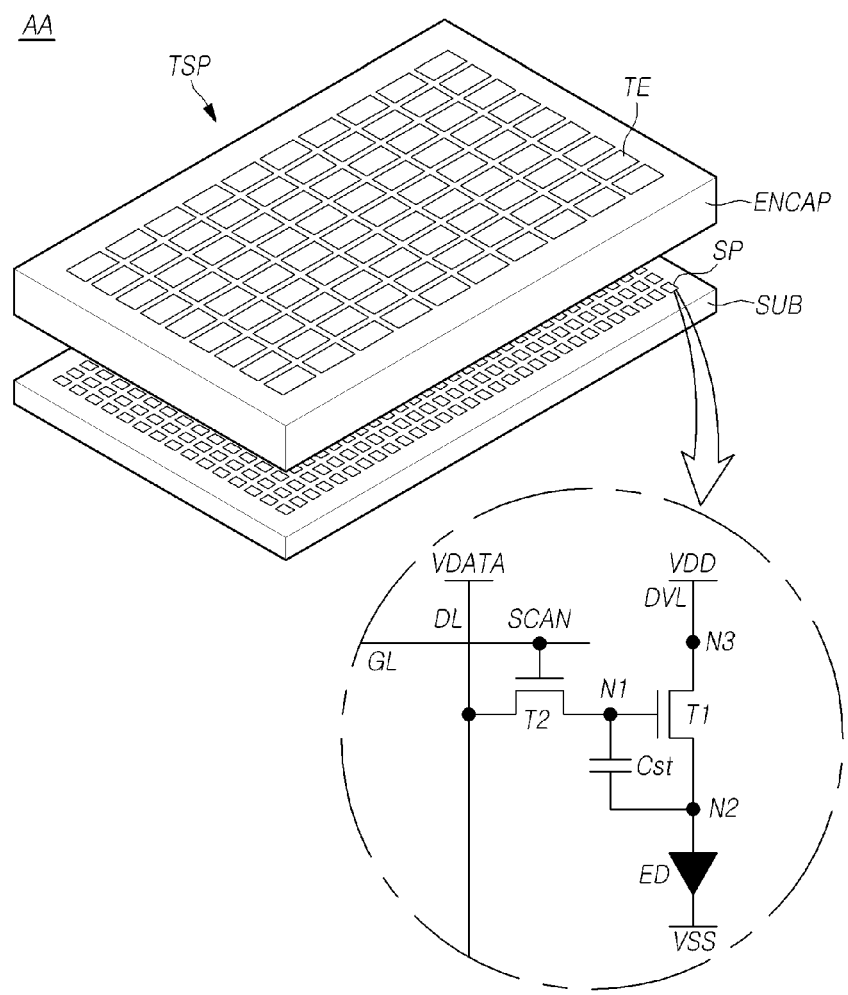
FIG. 9 is a perspective view illustrating an aspect of a structure in which the touch panel (TSP) is embedded in a display panel (DISP) according to aspects of the present disclosure.

FIG. 9 is a perspective view illustrating a structure in which the touch panel (TSP) is embedded in a display panel (DISP) according to the present disclosure.

Referring to FIG. 9, in the active area (AA) of the display panel (DISP), the plurality of subpixels (SP) may be arranged on the substrate (SUB). Each subpixel (SP) may include the light emitting element (ED), the first transistor (T1) for driving the light emitting element (ED), the second transistor (T2) for transmitting the data voltage (VDATA) to the first node (N1) of the first transistor (T1), and the storage capacitor (Cst) for maintaining a constant voltage for one frame.

The first transistor (T1) may include the first node (N1) to which the data voltage is applied, a second node (N2) to be electrically connected to the light emitting element (ED), and a third node (N3) to which the driving voltage (VDD) from a driving voltage line (DVL) is applied. The first node (N1) may be a gate node, the second node (N2) may be a source node or a drain node, and the third node (N3) may be a drain node or a source node. The first transistor (T1) may be also referred to as a driving transistor for driving the light emitting element (ED).

The light emitting element (ED) may include a first electrode (e.g., an anode electrode), a light emitting layer and a second electrode (e.g., a cathode electrode). The first electrode may be electrically connected to the second node (N2) of the first transistor (T1) and a base voltage (VSS) may be applied to the second electrode. The light emitting layer in the light emitting element (ED) may include a plurality of layers. The light emitting layer may be an organic light emitting layer containing an organic material. In this case, the light emitting element (ED) may be an organic light emitting diode (OLED).

The second transistor (T2) may be controlled to be turned on and off by a scan signal (SCAN) applied through the gate line (GL) and may be electrically connected between the first node (N1) of the first transistor (M1) and the data line (DL). The second transistor (M2) may be also referred to as a switching transistor. The second transistor (M2) is turned on by the scan signal (SCAN) and transfers the data voltage (VDATA) supplied from the data line (DL) to the first node (N1) of the first transistor (T1).

The storage capacitor (Cst) may be electrically connected between the first node (N1) and the second node (N2) of the first transistor (T1).

Each subpixel (SP) may have a 2T1C structure including two transistors (T1, T2) and one capacitor (Cst) as shown in FIG. 11, and in some cases, may further include one or more transistors or one or more capacitors.

The storage capacitor (Cst) may not be a parasitic capacitor (e.g., Cgs, Cgd) which is an internal capacitor existing between the first node (N1) and the second node (N2) of the first transistor (T1) but may be an external capacitor intentionally designed outside the first transistor (T1).

Each of the first transistor (T1) and the second transistor (T2) may be an n-type transistor or a p-type transistor.

As described above, the circuit elements such as the light emitting element (ED), two or more transistors (M1, M2) and one or more capacitors (Cst) may be arranged in the display panel (DISP). Such a circuit element (in particular, the light emitting element ED) may be vulnerable to external moisture or oxygen, and therefore, the encapsulation layer (ENCAP) for preventing external moisture or oxygen from introducing into the circuit element (in particular, the light emitting element ED) may be disposed on the display panel (DISP).

The encapsulation layer (ENCAP) may be a single layer or may be a plurality of layers.

For example, in the case that the encapsulation layer (ENCAP) comprises a plurality of layers, the encapsulation layer (ENCAP) may include one or more inorganic encapsulation layers and one or more organic encapsulation layers. As a specific example, the encapsulation layer (ENCAP) may comprise a first inorganic encapsulation layer, an organic encapsulation layer and a second inorganic encapsulation layer. Here, the organic encapsulation layer may be located between the first inorganic encapsulation layer and the second inorganic encapsulation layer.

The first inorganic encapsulation layer may be formed on the second electrode (e.g., the cathode electrode) so as to be closest to the light emitting element (ED). The first inorganic encapsulation layer may be formed of an inorganic insulating material capable of low temperature deposition such as silicon nitride (SiNx), silicon oxide (SiOx), silicon oxynitride (SiON), or aluminum oxide ($Al_2O_3$). Accordingly, since the first inorganic encapsulation layer is deposited in a low-temperature atmosphere, damage to the light emitting layer (organic light emitting layer) vulnerable to a high-temperature can be prevented during the deposition of the first inorganic encapsulation layer.

The organic encapsulation layer may have a smaller area than the first inorganic encapsulation layer and may be formed to expose both ends of the first inorganic encapsulation layer. The organic encapsulation layer may function as a buffer for relieving the stress between the respective layers due to the bending of the touch display device, and can enhance the planarization performance. The organic encapsulation layer may be formed of, for example, an organic insulating material such as acrylic resin, epoxy resin, polyimide, polyethylene or silicon oxycarbide (SiOC).

The second inorganic encapsulation layer may be formed on the organic encapsulation layer so as to cover the upper surface and the side surfaces of the organic encapsulation layer and the first inorganic encapsulation layer, respectively. Accordingly, the second inorganic encapsulation layer can minimize or prevent external moisture or oxygen from penetrating into the first inorganic encapsulation layer and the organic encapsulation layer. The second inorganic encapsulation layer may be formed of, for example, an inorganic insulating material such as silicon nitride (SiNx), silicon oxide (SiOx), silicon oxynitride (SiON), or aluminum oxide ($Al_2O_3$).

In the touch display device according to the aspects of the present disclosure, the touch panel (TSP) may be formed on the encapsulation layer (ENCAP).

That is, in the touch display device, the touch sensor structure such as the plurality of touch electrodes (TE) forming the touch panel (TSP) may be disposed on the encapsulation layer (ENCAP).

In the touch sensing, the touch driving signal or the touch sensing signal may be applied to the touch electrode (TE). Therefore, in the touch sensing, a potential difference may be formed between the touch electrode (TE) and the cathode electrode disposed with the encapsulation layer (ENCAP) therebetween, and unnecessary parasitic capacitance may be generated. Since this parasitic capacitance may lower the touch sensitivity, the distance between the touch electrode (TE) and the cathode electrode may be set to a predetermined value (for example, 5 μm) or more. For this, for example, the thickness of the encapsulation layer (ENCAP) may be designed to be at least 5 μm or more.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A display apparatus comprising:
   a substrate;
   a display area defined on the substrate and on which a plurality of pixels are disposed;
   a pad area defined on the substrate and on which a plurality of pads are disposed;
   a circuit area including a plurality of multiplexer circuits disposed between the display area and the pad area;
   a touch sensor part including a plurality of touch electrodes disposed at the display area;
   a plurality of touch electrode lines connecting the plurality of touch electrodes and the plurality of multiplexer circuits; and
   a touch wiring connecting the plurality of multiplexer circuits and the plurality of pads,
   wherein the plurality of multiplexer circuits selectively connects a touch electrode line among the plurality of touch electrode lines with the touch wiring, and
   wherein the plurality of pads includes a first pad for supplying a touch signal and a second pad for supplying a display signal, and the touch wiring is connected to the first pad for supplying the touch signal, and
   wherein the plurality of multiplexer circuits is disposed on the same substrate as the plurality of pads including the first pad and the second pad.

2. The display apparatus of claim 1, further comprising:
   a cathode layer disposed on the substrate; and
   an encapsulation layer disposed on the cathode layer, wherein the touch electrode is disposed on the encapsulation layer.

3. The display apparatus of claim 2, wherein the touch electrode line is disposed along a side surface of the encapsulation layer in an outer area of the display area.

4. The display apparatus of claim 2, further comprising a buffer layer disposed on the encapsulation layer, wherein the touch electrode is disposed on the buffer layer disposed on the encapsulation layer.

5. The display apparatus of claim 1, wherein the multiplexer circuit includes a same metal as the touch electrode line.

6. The display apparatus of claim 1, further comprising a bending area on the substrate disposed between the circuit area and the pad area or between the display area and the circuit area.

7. The display apparatus of claim 6, wherein the bending area includes a first organic film disposed on the substrate, a first wiring disposed on the first organic film, a second organic film disposed on the first wiring, a second wiring disposed on the second organic film where a contact hole is formed corresponding to at least two points, and
   wherein the second wiring is connected to the first wiring through the contact hole.

8. The display apparatus of claim 7, wherein the second wiring includes the touch electrode lines.

9. The display apparatus of claim 1, wherein the plurality of multiplexer circuits selects one among at least two of the touch electrode lines in response to a selection signal, and transfers the touch signal to the selected touch electrode lines.

10. The display apparatus of claim 1, wherein the plurality of multiplexer circuits comprises:

a first operator which receives a touch signal, a first selection signal, and a second selection signal, performs NOT operations on the first selection signal and the second selection signal, performs AND operation on the NOT operated first selection signal, the NOT operated second selection signal and the touch signal, and outputs a AND operation result to the first touch electrode line;

a second operator which receives the touch signal, the first selection signal, and the second selection signal, performs NOT operation on the first selection signal, performs AND operation on the NOT operated first selection signal, the second selection signal and the touch signal, and outputs a AND operation result to the second touch electrode line;

a third operator which receives the touch signal, the first selection signal, and the second selection signal, performs NOT operation on the second selection signal, performs AND operation on the NOT operated second selection signal, the first selection signal and the touch signal, and outputs a AND operation result to the third touch electrode line; and a fourth operator which receives the touch signal, the first selection signal, and the second selection signal, performs AND operation on the first selection signal, the second selection signal and the touch signal, and outputs a AND operation result to the fourth touch electrode line.

11. The display apparatus of claim 1, wherein each of the plurality of touch electrodes has a mesh shape having one or more openings.

12. The display apparatus of claim 11, wherein each of the one or more openings is located corresponding to a light emitting region of the pixel.

13. A display apparatus comprising:
a substrate;
a display area defined on the substrate, on which a plurality of pixels are arranged;
a pad area defined on the substrate and on which a plurality of pads are disposed;
a circuit area including a plurality of multiplexer circuits disposed between the display area and the pad area;
a bending area defined on the substrate and disposed between the display area and the pad area;
a touch sensor part including a plurality of touch electrodes disposed at the display area;
a touch wiring connecting the plurality of multiplexer circuits and the plurality of pads;
a first organic film disposed at the bending area;
a first wiring disposed on the first organic film;
a second organic film disposed on the first wiring; and
a second wiring disposed on the second organic film where a contact hole is formed corresponding to at least two points,
wherein the second wiring is connected to the first wiring through the contact hole,
wherein the plurality of pads includes a first pad for supplying a touch signal and a second pad for supplying a display signal, and the touch wiring is connected to the first pad for supplying the touch signal, and wherein the plurality of multiplexer circuits is disposed on the same substrate as the plurality of pads including the first pad and the second pad.

14. The display apparatus of claim 13, wherein the second wiring covers a part of an upper portion of the second organic film.

15. The display apparatus of claim 13, wherein the plurality of touch electrodes is connected to the second wiring.

16. The display apparatus of claim 13, further comprising:
a cathode layer disposed on the substrate; and
an encapsulation layer disposed on the cathode layer, wherein the touch electrode is disposed on the encapsulation layer.

17. The display apparatus of claim 16, further comprising a buffer layer disposed on the encapsulation layer, and the touch electrode is disposed on the buffer layer.

18. The display apparatus of claim 13, further comprising:
a plurality of touch electrode lines connecting the plurality of touch electrodes and the plurality of multiplexer circuits,
wherein the plurality of multiplexer circuits selectively connects a touch electrode line among the plurality of touch electrode lines to the touch wiring.

19. The display apparatus of claim 18, wherein the touch electrode line is disposed along a side surface of the encapsulation layer in an outer area of the display area.

20. The display apparatus of claim 18, wherein the multiplexer circuit includes a same metal as the touch electrode line.

21. The display apparatus of claim 18, wherein the multiplexer circuit comprises:
a first operator which receives a touch signal, a first selection signal, and a second selection signal, performs NOT operations on the first selection signal and the second selection signal, performs AND operation on the NOT operated first selection signal, the NOT operated second selection signal and the touch signal, and outputs a AND operation result to the first touch electrode line;

a second operator which receives the touch signal, the first selection signal, and the second selection signal, performs NOT operation on the first selection signal, performs AND operation on the NOT operated first selection signal, the second selection signal and the touch signal, and outputs a AND operation result to the second touch electrode line;

a third operator which receives the touch signal, the first selection signal, and the second selection signal, performs NOT operation on the second selection signal, performs AND operation on the NOT operated second selection signal, the first selection signal and the touch signal, and outputs a AND operation result to the third touch electrode line; and a fourth operator which receives the touch signal, the first selection signal, and the second selection signal, performs AND operation on the first selection signal, the second selection signal and the touch signal, and outputs a AND operation result to the fourth touch electrode line.

* * * * *